United States Patent
Kaneko et al.

(10) Patent No.: US 6,930,417 B2
(45) Date of Patent: Aug. 16, 2005

(54) A.C. MOTOR-INVERTER INTEGRATED DRIVE UNIT

(75) Inventors: Hiroyuki Kaneko, Yokohama (JP); Toshiro Shinohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 115 days.

(21) Appl. No.: 10/692,854

(22) Filed: Oct. 27, 2003

(65) Prior Publication Data

US 2004/0090130 A1 May 13, 2004

(30) Foreign Application Priority Data

Nov. 7, 2002 (JP) .......................................... 2002-323780

(51) Int. Cl.[7] .............................. H02K 9/00; H02K 1/12; H02K 7/14
(52) U.S. Cl. ........................ 310/58; 310/216; 310/68 R
(58) Field of Search ................................ 310/216, 217, 310/54, 58, 68 R, 254, 71

(56) References Cited

U.S. PATENT DOCUMENTS 4,316,112 A * 2/1982 Waldron et al. ............ 310/258

5,491,370 A 2/1996 Schneider et al.
6,759,778 B2 * 7/2004 Nishiyama et al. ..... 310/156.53
2005/0040716 A1 * 2/2005 Schmid et al. ................ 310/71

FOREIGN PATENT DOCUMENTS

JP 2000-166176 A 6/2000
WO WO 02/075901 A1 9/2002

* cited by examiner

*Primary Examiner*—Tran Nguyen
(74) *Attorney, Agent, or Firm*—Foley & Lardner LLP

(57) ABSTRACT

An a.c. motor-inverter integrated drive unit comprises an a.c. motor powered by an alternating current. The motor includes a rotor rotatable about a rotation axis, a plurality of stator cores arranged about the rotation axis at evenly spaced intervals to constitute a cylindrical stator structure, a plurality of stator coils disposed on the stator cores respectively and a plurality of cooling passages formed in the stator cores respectively. An inverter is combined with the motor. The inverter converts a direct current to an alternating current and includes a plurality of power drivers which are arranged on the stator cores respectively. Wire members are used for connecting the power drivers and the stator coils respectively.

15 Claims, 6 Drawing Sheets

A.C. MOTOR-INVERTER INTEGRATED DRIVE UNIT

BACKGROUND OF THE INVENTION

1. Field of the Invention

The present invention relates in general to drive units of a type including an alternating current motor (which will be referred to a.c. motor hereinafter) and more particularly to a so-called a.c. motor-inverter integrated drive unit in which an a.c. motor and an inverter are integrally combined.

2. Description of Related Art

One of the above-mentioned integrated drive units is shown in Japanese Laid-Open Patent Application (Tokkai) 2000-166176. In this unit, elements of the inverter are concentrated on an upper portion of the a.c. motor. However, this arrangement tends to cause increase in length between output terminals of power drivers of the inverter and input terminals of stator coils of the a.c. motor. Thus, connection of each output terminal of the inverter to corresponding input terminal of the a.c. motor needs an elongate wiring member, which brings about a considerable heat loss caused by an increased electric resistance possessed by the wiring member. Besides the heat loss, the elongate wiring member causes generation of various noises.

In the integrated drive unit of the above-mentioned published application, cooling passages are respectively formed in a cylindrical stator structure of the a.c. motor and a power driver part of the inverter, and these cooling passages are connected through a generally U-shaped pipe which is exposed to the outside of the unit. That is, the a.c. motor and the inverter have each a cooling passage. However, due to its inherent construction, employment of the cooling passage in each of the motor and the inverter causes a bulky arrangement of a cooling system. In particular, when the motor is locked or forced to run at a very low speed under generation of a maximum torque, the cooling system has to bear the sum of the maximum loss of the inverter and the maximum loss of the stator coils of the motor. This means that the cooling system needs a larger or bulky size.

SUMMARY OF THE INVENTION

It is therefore an object of the present invention to provide an a.c. motor-inverter integrated drive unit which is free of the above-mentioned drawbacks.

According to a first aspect of the present invention, there is provided an a.c. motor-inverter integrated drive unit which comprises an a.c. motor powered by an alternating current, the motor including a rotor rotatable about a rotation axis, a plurality of stator cores arranged about the rotation axis at evenly spaced intervals to constitute a cylindrical stator structure, a plurality of stator coils disposed on the stator cores respectively and a plurality of cooling passages formed in the stator cores respectively; an inverter which converts a direct current to an alternating current and includes a plurality of power drivers which are arranged on the stator cores respectively; and wiring members through which the power drivers and the stator coils are connected respectively.

According to a second aspect of the present invention, there is provided an a.c. motor-inverter integrated drive unit which comprises a three-phase a.c. motor powered by a three-phase alternating current, the motor including a rotor rotatable about a rotation axis, a plurality of stator cores arranged about the rotation axis at evenly spaced intervals to constitute a cylindrical stator structure, a plurality of stator coils disposed on the stator cores respectively and a plurality of cooling passages formed in the stator cores respectively; an inverter which converts a direct current to a three-phase alternating current and includes a plurality of power drivers which are arranged on the stator cores respectively; and wiring members through which the power drivers and the stator coils are connected respectively, the wiring members being the same in shape and construction.

DETAILED DESCRIPTION OF THE EMBODIMENTS

In the following, three, viz., first, second and third embodiments 1000, 2000 and 3000 of the present invention will be described in detail with reference to the accompanying drawings.

Figure 1:
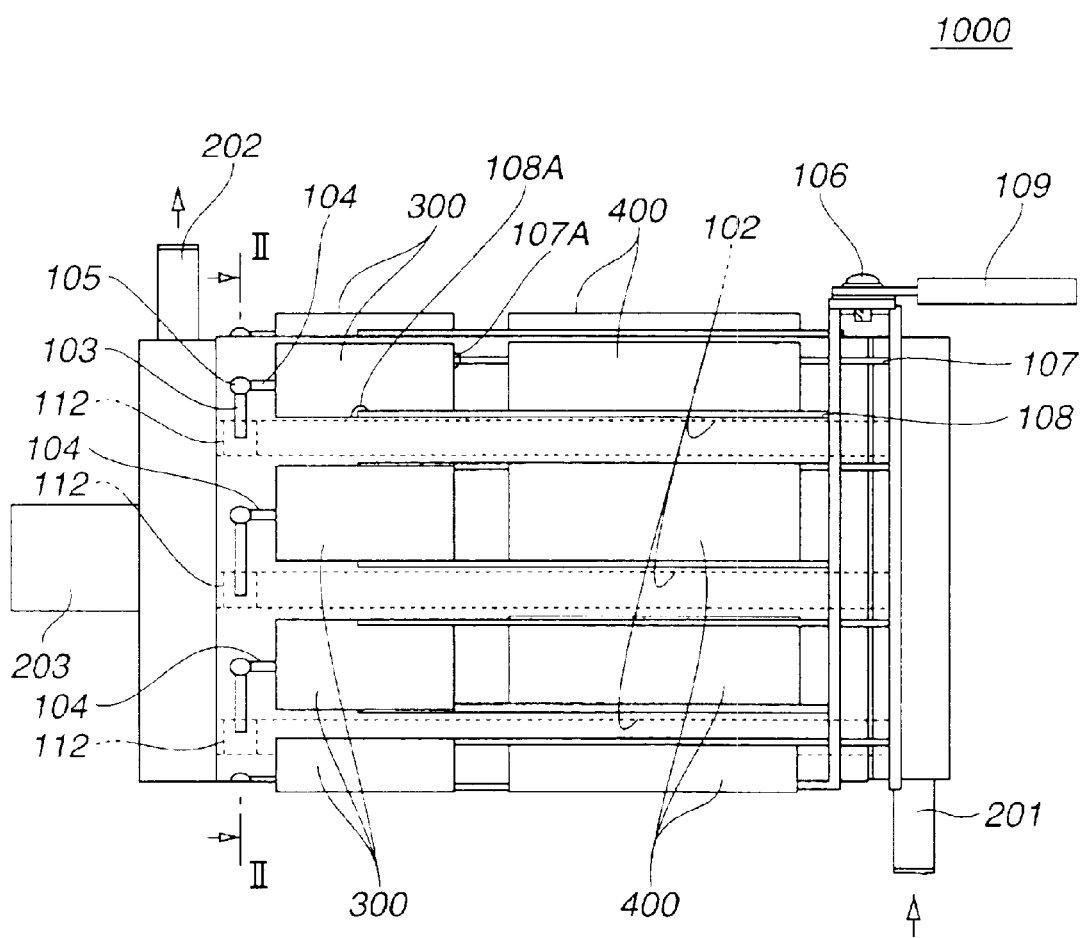
FIG. 1 is a side view of an a.c. motor-inverter integrated drive unit which is a first embodiment of the present invention.
Figure 2:
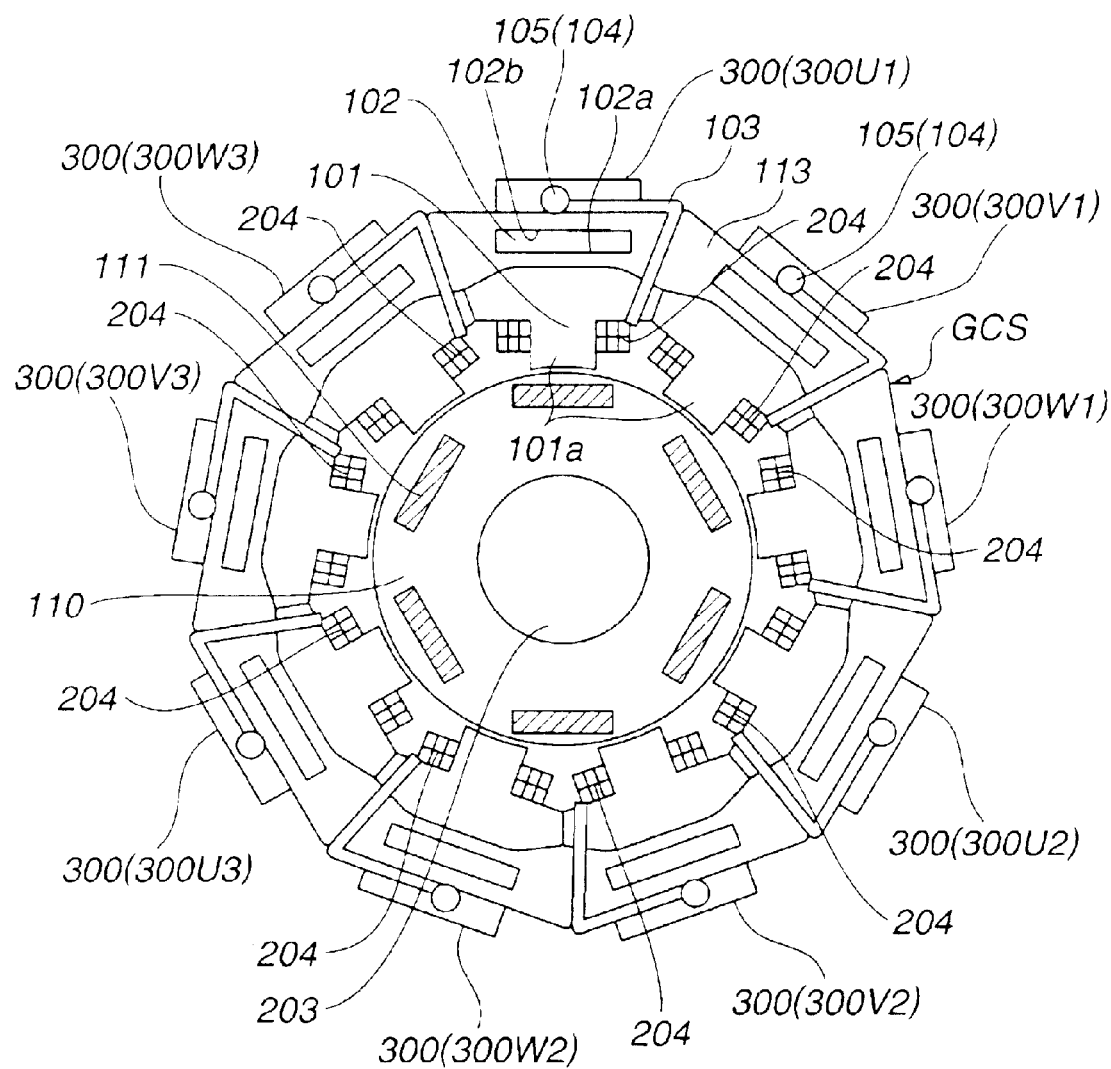
FIG. 2 is a sectional view taken along the line II—II of FIG. 1.
Figure 3:
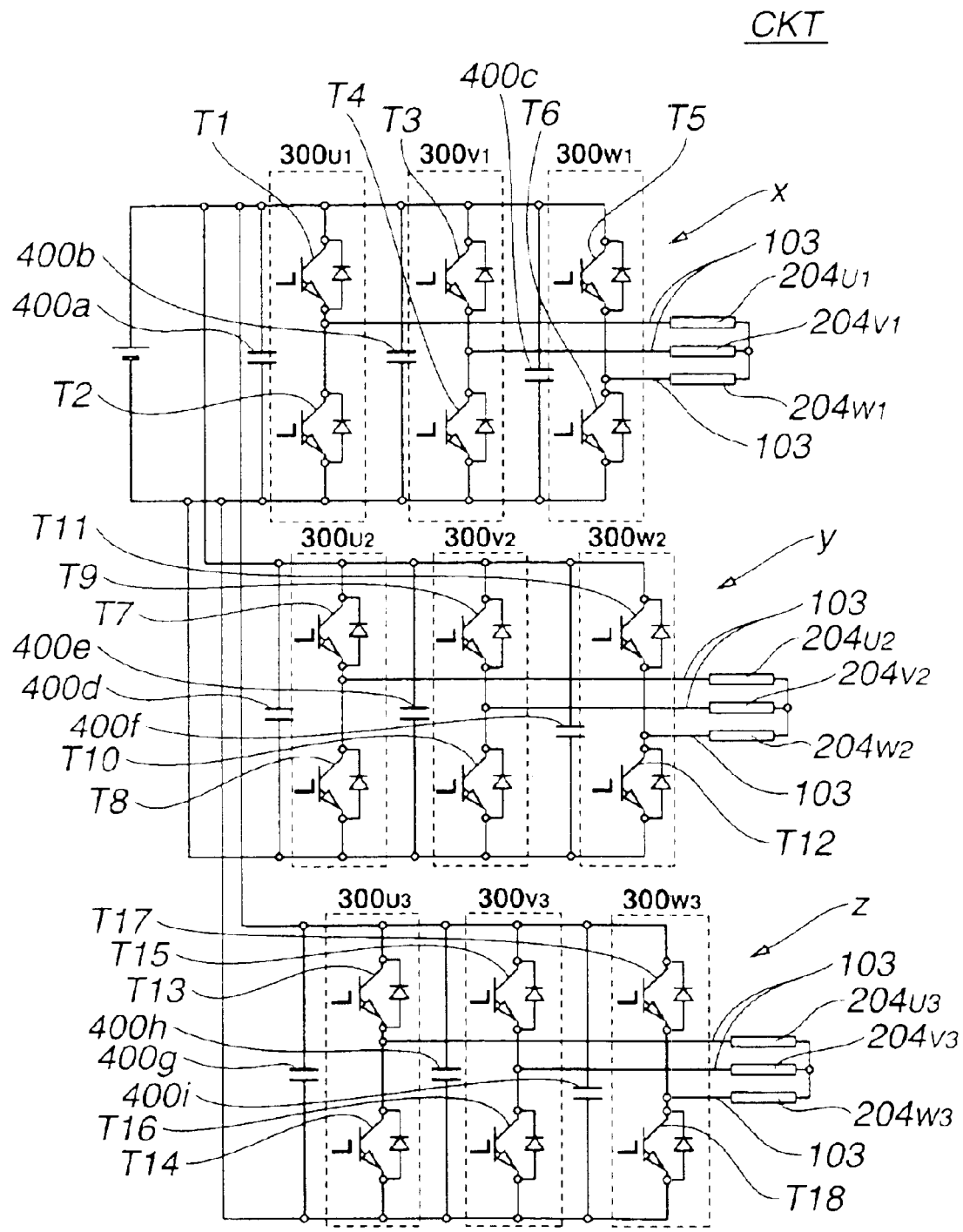
FIG. 3 is an electric equivalent circuit of an inverter employed in the first embodiment.

Referring to FIGS. 1 to 3, there is shown an a.c. motor-inverter integrated drive unit 1000 which is a first embodiment of the present invention.

An a.c. motor employed in this embodiment is of a so-called inner rotor type a.c. motor. More specifically, the motor is of a concentrated winding magnet embedded type three-phase alternating current motor.

As is seen from FIGS. 1 and 2, the a.c. motor comprises a rotor 110 which is concentrically connected to a motor rotation shaft 203 to rotate therewith.

As is seen from FIG. 2, rotor 110 has a plurality of magnets 111 embedded therein. The plurality of magnets 111 are arranged around motor rotation shaft 203 at evenly spaced intervals.

Around rotor 110, there are arranged, at evenly spaced intervals, nine stator cores 101 which constitute a generally cylindrical stator structure "GCS".

As will be described in detail hereinafter, these stators cores 101 have respective stator coils 204 mounted thereon, which are respectively powered by three phases "U", "V" and "W" of alternating current. That is, under application of the three-phase alternating current electric power to stator coils 204, rotor 110 is forced to rotate together with rotation shaft 203. The three-phase alternating current electric power is outputted from or produced by an after-mentioned inverter.

Each stator core 101 is made of a laminated steel plate and comprises a projected portion 101a (or teeth) and a back yoke portion 113. In the back yoke portion 113, there is formed a cooling passage 102 that extends axially. As shown, the nine cooling passages 102 are arranged to concentrically surround rotation shaft 203 at evenly spaced intervals. Under operation, cooling water is forced to flow in the cooling passages 102 for cooling the neighboring parts. As shown, each cooling passage 102 has a rectangular cross section and includes first and second main cooling surfaces 102a and 102b which face each other. Each stator core 101 has a stator coil 204 disposed about the projected portion 101a.

As shown, around the cylindrical stator structure "GCS", there are arranged, at positions behind the nine cooling passages 102, nine main drive upper/lower arm power switching elements (or power drivers) 300 respectively.

As is seen from FIG. 2, each stator coil 204 is connected to the corresponding or closest power switching element 300 through a wiring member 103 which passes through the cylindrical stator structure "GCS" avoiding the corresponding or closest cooling passage 102. As is seen from FIG. 1, for assuring a watertight sealing, each cooling passage 102 is provided with a land portion 112. However, the land portion 112 may be removed if assured watertight sealing is obtained without the aid of such portion 112.

It is to be noted that each power switching element 300 and the corresponding wiring member 103 are installed in an imaginary block and each power switching element 300 constitutes a power driver for driving the alternating current motor. Thus, pine power drivers in total are provided in the embodiment 1000.

It is to be noted that as is seen from FIG. 2, the above-mentioned imaginary block is an enclosed area in which one stator core 101, corresponding stator coil 204, corresponding cooling passage 102 and corresponding power switching element 300 are installed. Thus, in the embodiment 1000, nine imaginary blocks are provided in total. Furthermore, in this embodiment 1000, each of cooling passages 102 is positioned between the corresponding power switching element 300 and the corresponding stator coil 204. Furthermore, each cooling passage 102, the corresponding power switching element 300 and the corresponding stator coil 204 are arranged on an imaginary line that extends radially outward from the rotation axis of the rotor 110. The nine wiring members 103 are the same in shape and construction.

As is understood from FIG. 1, the nine cooling passages 102 have right ends (as viewed in the drawing) connected to an inlet pipe 201 and left ends connected to an outlet pipe 202. Under operation, cooling water is led into nine cooling passages 102 from inlet pipe 201 and the water warmed in the passages 102 is discharged from outlet pipe 202.

Because of the three phases "U", "V" and "W" possessed by the alternating current, stator coils 204 as well as power switching elements 300 that drive stator coils 204 are all grouped into three, which constitute three electric circuits as will be described in detail hereinafter.

For producing a variable width pulse voltage from the direct current voltage applied thereto, each power switching element 300 has upper and lower arms. That is, if the power switching elements 300 are of a type using insulated-gate bipolar transistors (viz., IGBT), eighteen transistors are employed with respective diodes, as will be clarified from the following.

Referring to FIG. 3, there is shown an electric equivalent circuit "CKT" of power drivers of the inverter that is employed in the embodiment 1000. The inverter uses therein eighteen insulated-gate bipolar transistors (viz., IGBT).

As shown in the drawing and described hereinabove, nine stator coils 204 and nine power switching elements 300 are grouped into three electric circuits "X", "Y" and "Z" which are connected to one another in parallel manner as will become apparent hereinbelow.

Circuit "X" generally comprises six transistors T1, T2, T3, T4, T5 and T6 and three smoothing condensers 400a, 400b and 400c. Transistors T1 and T2 are combined with condenser 400a and constitute a unit $300_{U1}$ to produce phase "U" of the alternating current, transistors T3 and T4 are combined with condenser 400b and constitute a unit $300_{V1}$ to produce phase "V" of the alternating current and transistors T5 and T6 are combined with condenser 400c and constitute a unit $300_{W1}$ to produce phase "W" of the alternating current. First stator coil $204_{U1}$ has an input portion connected to a line that connects transistors T1 and T2, second stator coil $204_{V1}$ has an input portion connected to a line that connects transistors T3 and T4 and third stator coil $204_{W1}$ has an input portion connected to a line that connects transistors T5 and T6. Output portions of the first, second and third stator coils $204_{U1}$, $204_{V1}$ and $204_{W1}$ are connected together.

Similar to circuit "X", circuit "Y" generally comprises six transistors T7, T8, T9, T10, T11 and T12 and three smoothing condensers 400d, 400e and 400f. Transistors T7 and T8 are combined with condenser 400d and constitute a unit $300_{U2}$ to produce phase "U" of the alternating current, transistors T9 and T10 are combined with condenser 400e and constitute a unit $300_{V2}$ to produce phase "V" of the alternating current and transistors T11 and T12 are combined with condenser 400f and constitute a unit $300_{W2}$ to produce phase "W" of the alternating current. Fourth stator coil $204_{U2}$ has an input portion connected to a line that connects transistors T7 and T8, fifth stator coil $204_{V2}$ has an input portion connected to a line that connects transistors T9 and T10 and sixth stator coil $204_{W2}$ has an input portion connected to a line that connects transistors T11 and T12. Output portions of the fourth, fifth and sixth stator coils $204_{U2}$, $204_{V2}$ and $204_{W2}$ are connected together.

Also circuit "Z" generally comprises six transistors T13, T14, T15, T16, T17 and T18 and three smoothing condensers 400g, 400h and 400i. Transistors T13 and T14 are combined with condenser 400g and constitute a unit $300_{U3}$ to produce phase "U" of the alternating current, transistors T15 and T16 are combined with condenser 400h and constitute a unit $300_{V3}$ to produce phase "V" of the alternating current and transistors T17 and T18 are combined with condenser 400i and constitute a unit $300_{W3}$ to produce phase "W" of the alternating current. Seventh stator coil $204_{U3}$ has an input portion connected to a line that connects transistors T13 and T14, eighth stator coil $204_{V3}$ has an input portion connected to a line that connects transistors T15 and T16 and ninth stator coil $204_{W3}$ has an input portion connected to a line that connects transistors T17 and T18. Output portions of the seventh, eighth and ninth stator coils $204_{U3}$, $204_{V3}$ and $204_{W3}$ are connected together.

Upper bus bars of circuits "Y" and "Z" are connected to an upper bus bar of circuit "X", and lower bus bars of circuits "Y" and "Z" are connected to a lower bus bar of circuit "X". Upper and lower bus bars of circuit "X" are connected to positive and negative terminals of a direct voltage source, as shown.

That is, power switching elements 300 that produce phase "U" of the alternating current are those that include units $300_{U1}$, $300_{U2}$ and $300_{U3}$ respectively. Stator coils 204 powered by power switching elements 300 of the units $300_{U1}$, $300_{U2}$ and $300_{U3}$ are the stator coils $204_{U1}$, $204_{U2}$ and $204_{U3}$. That is, the three power switching elements 300 of the units $300_{U1}$, $300_{U2}$ and $300_{U3}$ are those that produce phase "U" of the alternating current), and thus through the three stator coils $204_{U1}$, $204_{U2}$ and $204_{U3}$, current with phase "U" is forced to flow.

Power switching elements 300 that produce phase "V" of the alternating current are those that include units $300_{V1}$, $300_{V2}$ and $300_{V3}$ respectively. Stator coils 204 powered by power switching elements 300 of the units $300_{V1}$, $300_{V2}$ and $300_{V3}$ are the stator coils $204_{V1}$, $204_{V2}$ and $204_{V3}$. That is, the three power switching elements 300 of the units $300_{V1}$, $300_{V2}$ and $300_{V3}$ are those that produce phase "V" of the alternating current, and thus through the three stator coils $204_{V1}$, $204_{V2}$ and $204_{V3}$, current with phase "V" is forced to flow.

Like the above, power switching elements 300 that produce phase "W" of the alternating current are those that include units $300_{W1}$, $300_{W2}$ and $300_{W3}$ respectively. Stator coils 204 powered by power switching elements 300 of the units $300_{W1}$, $300_{W2}$ and $300_{W3}$ are the stator coils $204_{W1}$, $204_{W2}$ and $204_{W3}$. That is, the three power switching elements 300 of the units $300_{W1}$, $300_{W2}$ and $300_{W3}$ are those that produce phase "W" of the alternating current, and thus through the three stator coils $204_{W1}$, $204_{W2}$ and $204_{W3}$, current with phase "W" is forced to flow.

As is understood from the above, in the three power switching elements 300 that respectively include units $300_{U1}$, $300_{U2}$ and $300_{U3}$, the three power switching elements 300 that respectively include units $300_{V1}$, $300_{V2}$ and $300_{V3}$ or the three power switching elements 300 that respectively include units $300_{W1}$, $300_{W2}$ and $300_{W3}$, there are arranged six power elements which inevitably generate heat under operation. In order to avoid unbalanced heat distribution in the power switching elements 300, close arrangement of the six power elements and/or usage of heat spreaders with a higher thermal conductivity is needed.

As is seen from FIGS. 1 and 2, each power switching element 300 has two direct current power input terminals 107A and 108A and one output terminal 104. The two direct current power input terminals 107A and 108A are connected to direct current power inlet wirings 109 (only one is shown) through smoothing condenser 400 (viz., 400a, 400b, 400c, 400d, 400e, 400f, 400g, 400h or 400i), two wirings 107 and 108 and terminal connectors 106 (only one is shown).

Output terminal 104 of each power switching element 300 has a terminal head 105 to which one end of the corresponding wiring member 103 from the corresponding stator coil 204 is connected. That is, as is understood from FIG. 2, each power switching element 300 and its corresponding stator coil 204 are connected through one wiring member 103 that runs along the shortest route therebetween bypassing or avoiding the corresponding cooling passage 102.

In the following, advantages of first embodiment 1000 of the present invention will be described.

First, as is described hereinabove, in first embodiment 1000, the plurality of power switching elements 300 are arranged around the generally cylindrical stator structure "GCS" (see FIG. 2) at evenly spaced intervals. Accordingly, output terminals 104 of the power switching elements 300 can be connected to their corresponding stator coils 204 through short wiring members 103 of the same shape. Because of the evenly spaced arrangement of wiring members 103 around the cylindrical stator structure "GCS", simple production steps are only needed for producing the a.c. motor-inverter integrated drive unit 1000, which brings about reduction in cost of the same.

Second, in the first embodiment 1000, each of stator coils 204 cooperates with a dedicated one of the power switching elements 300. Accordingly, for each of the wiring members 103 between stator coils 204 and power switching elements 300, it is only necessary to bear or run a current of which magnitude is reduced by a certain degree that is induced by the plurality, viz., nine, of the wiring members 103. Reduction in current flowing through each wiring member 103 means reduction in Joule heat produced in the wiring member 103, which facilitates a connecting manner through which each wiring member 103 is connected to both the output terminal 104 of the corresponding power switching element 300 and the corresponding stator coil 204. More specifically, each wiring member 103 can be simply and easily connected to the output terminal 104 and the stator coil 204 by means of spring-biased clips, soldering or the like. Of course, this simple wire connecting technique brings about a compact and low-cost construction. In the above-mentioned known unit of Japanese Laid-Open Patent Application 2000-166176, three wiring members in total are used for connecting the inverter with the three-phase motor. Thus, in this known unit, each wiring member has to bear or run a current that is heavier than that in the embodiment 1000 of the invention by two times. As is known, in handling such heavier current, the above-mentioned simple connecting technique can not be used.

Third, in the first embodiment 1000 of the invention, between one stator coil 204 and the corresponding power switching element 300, there is provided one cooling passage 102 which has first main cooling surface 102a positioned in the vicinity of the stator coil 204 and second main cooling surface 102b positioned in the vicinity of the power switching element 300. That is, each power switching element 300 and the corresponding stator coil 204 have one cooling passage 102 in common. This induces compact construction of the a.c. motor-inverter integrated drive unit 1000 of the first embodiment.

Figure 4:
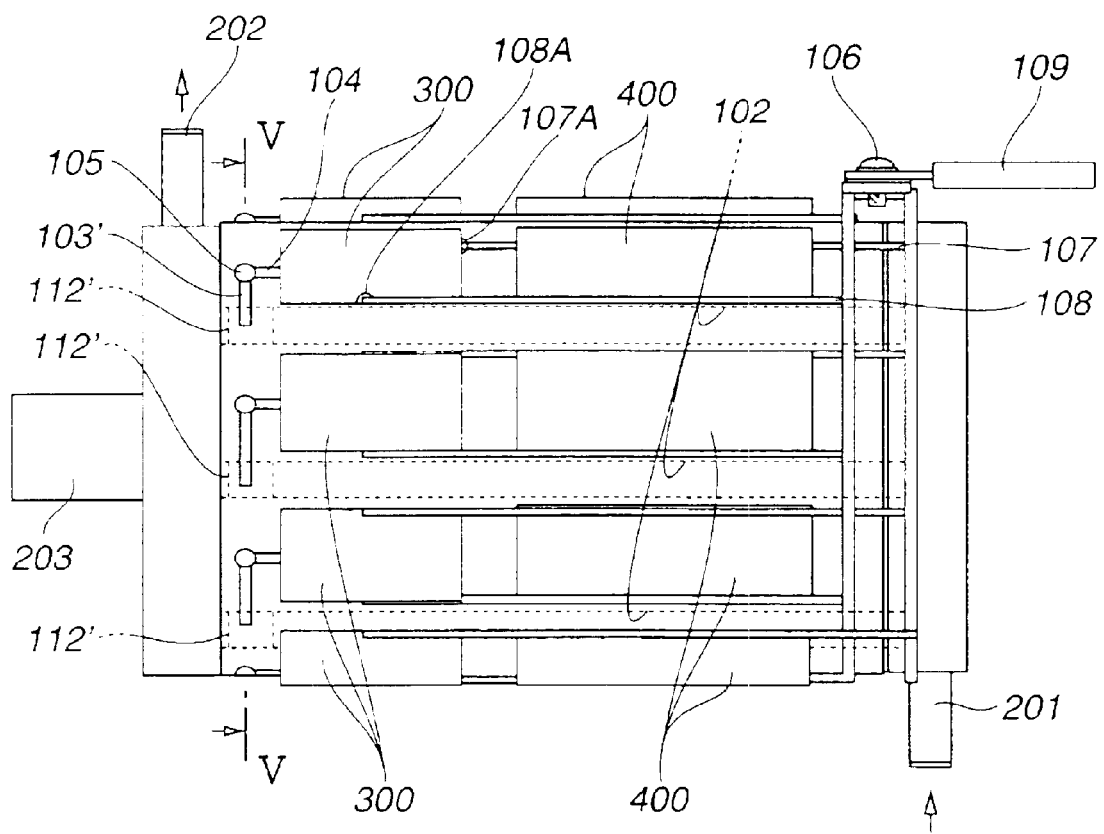
FIG. 4 is a view similar to FIG. 1, but showing an a.c. motor-inverter integrated drive unit which is a second embodiment of the present invention.
Figure 5:
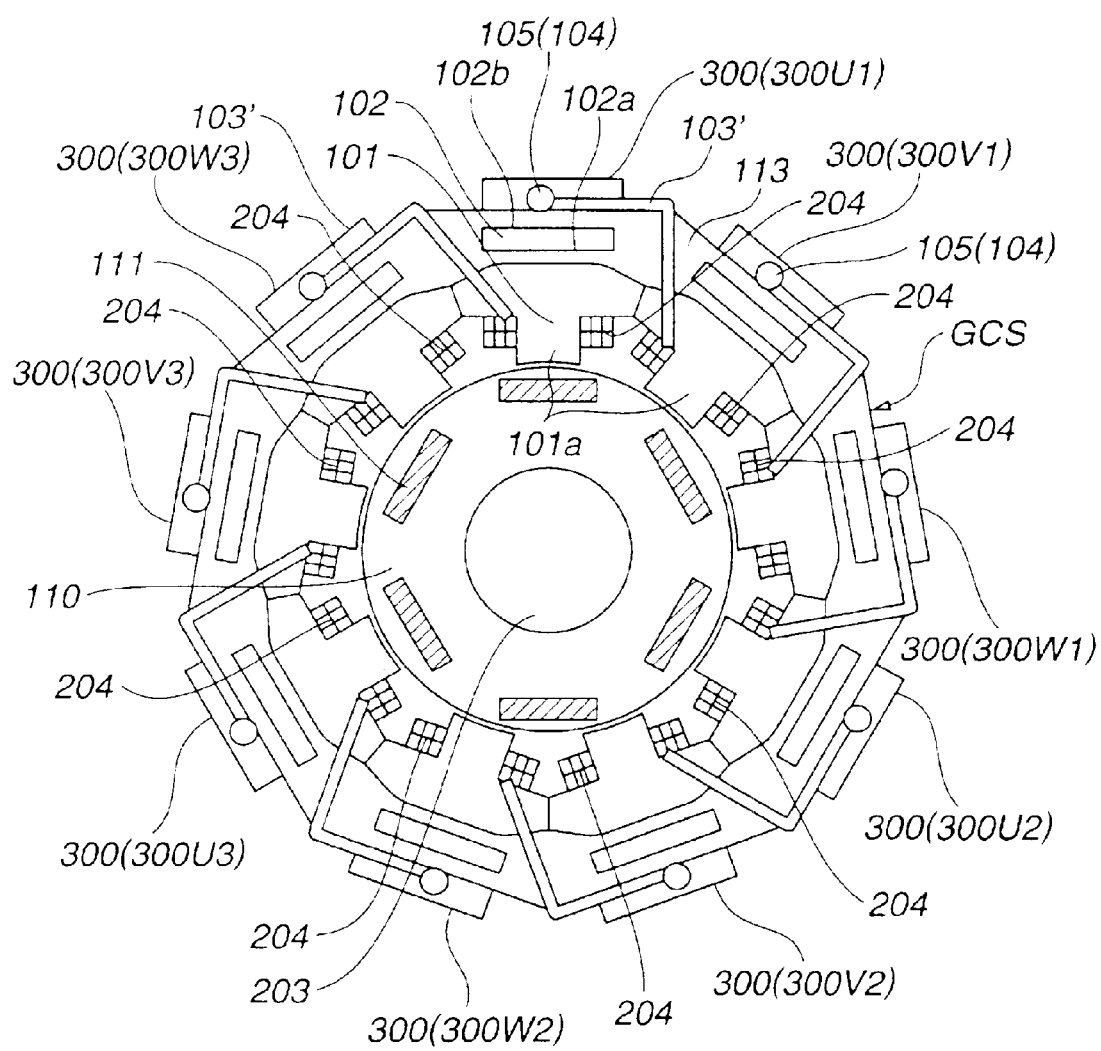
FIG. 5 is a sectional view taken along the line V—V of FIG. 4.

Referring to FIGS. 4 and 5, there is shown an a.c. motor-inverter integrated drive unit 2000 which is a second embodiment of the present invention.

Since the integrated drive unit 2000 of this second embodiment is similar in construction to that 1000 of the above-mentioned first embodiment, only portions or parts which are different from those of the first embodiment 1000 will be described in detail in the following.

As is seen from FIG. 4, a land portion 112' for each cooling passage 102 is somewhat larger than that 112 of the above-mentioned first embodiment 1000. As is described hereinabove, the land portion 112' is a means for making a watertight sealing of a part of each cooling passage 102.

As is seen from FIG. 5, in the second embodiment 200, a wiring member 103' from each power switching element 300 is connected to a stator coil 204 that is positioned next to a stator coil 204 that is closest to the power switching element 300. In other words, in this second embodiment 2000, one power switching element 300 (for example, the power switching element 300 incorporated with unit $300_{U1}$) and a stator core 204 which are arranged to put therebetween their closest cooling passage 102 cooperate with different phases of the alternating current. More specifically, in this example, the power switching element 300 ($300_{U1}$) which produces phase "U" of the alternating current and the ninth stator core $204_{W3}$ which is powered by the power switching element 300 ($300_{W3}$) powered by phase "W" of the alternating current are installed in a common block in such a manner as to face each other with their closest cooling passage 102 placed therebetween.

Because of similar arrangement and construction to the above-mentioned first embodiment 1000, substantially the same advantages as those of the first embodiment 1000 are obtained also in the second embodiment 2000.

In the second embodiment 2000, one power switching element 300 and one stator core 204 which are arranged in each of the nine blocks putting therebetween their closest cooling passage 102 cooperate with different phases of the alternating current. That is, for example, the power switching element 300 ($300_{U1}$) that produces phase "U" of the alternating current and the ninth stator core $204_{W3}$ that is powered by the power switching element 3000 ($300_{W3}$) that produces phase "W" of the alternating current use their closest cooling passage 102 in common.

This arrangement brings about a more compact construction of the integrated drive unit 2000 of the second embodiment than the above-mentioned first embodiment 1000 for the reasons which will be described next.

In general, heat capacity of stator coils 204, stator cores 101 and heat spreaders fixed to power switching elements 300 is relatively high. Thus, under operation of the motor, stator coils 204 and power switching elements 300 which produce different (viz., three) phases of the alternating current have their heat loss leveled. If core loss and skin effect can be ignored, heat loss of each stator coil 204 is proportional to the square of the effective value of current flowing therethrough. Thus, in the arrangement of the first embodiment 1000, the nine stator coils 204 show an equal heat loss during operation of the motor. Furthermore, an upper arm transistor (IGBT) (see FIG. 3) and a lower arm transistor (IGBT) of the unit of each power switching element 300 show an equal heat loss, and an upper arm diode (no numeral) and a lower arm diode (no numeral) of the unit of each power switching element 300 show an equal heat loss. As a result, the nine power switching elements 300 show an equal heat loss and the nine stator coils 204 shows an equal heat loss.

However, in case wherein the motor is locked and/or the motor runs at a very low speed, the nine power switching elements 300 and the nine stator coils 204 fail to show their equal heat loss. For example, if the motor is locked at the time when a current of phase "U" flowing through the three stator coils $204_{U1}$, $204_{U2}$ and $204_{U3}$ shows its maximum positive value, it is considered that the current flowing through these stator coils $204_{U1}$, $204_{U2}$ and $204_{U3}$ shows a value that is the sum of a value of current flowing through three stator coils $204_{V1}$, $204_{V2}$ and $204_{V3}$ and a value of current flowing through other three stator coils $204_{W1}$, $204_{W2}$ and $204_{W3}$. Similar phenomenon occurs also in the nine power switching elements 300. Accordingly, in such case, the heat loss of three stator coils $204_{U1}$, $204_{U2}$ and $204_{U3}$ becomes larger than that of three stator coils $204_{V1}$, $204_{V2}$ and $204_{V3}$ or that of other three stator coils $204_{W1}$, $204_{W2}$ and $204_{W3}$, and the heat loss of three power switching elements 300 incorporated with units $300_{U1}$, $300_{U2}$ and $300_{U3}$ is larger than that of three power switching elements 300 incorporated with units $300_{V1}$, $300_{V2}$ and $300_{V3}$ or that of other three power switching elements 300 incorporated with units $300_{W1}$, $300_{W2}$ and $300_{W3}$. That is, in case of the first embodiment 1000, three of the nine blocks have a possibility of being highly heated as compared with the remaining six blocks when the motor is locked or the motor rotates at a very slow speed. Furthermore, under locked condition of the motor, the heat loss of each part is larger than that shown when the motor is normally rotated. Accordingly, when three stator coils $204_{U1}$, $204_{U2}$ and $204_{U3}$ ($204_{V1}$, $204_{V2}$ and $204_{V3}$ or $204_{W1}$, $204_{W2}$ and $204_{W3}$) and three power switching elements 300 incorporated with units $300_{U1}$, $300_{U2}$ and $300_{U3}$ ($300_{V1}$, $300_{V2}$ and $300_{V3}$ or $300_{W1}$, $300_{W2}$ and $300_{W3}$) are arranged to use their closest cooling passage 102 in common like in case of the first embodiment 1000, each cooling passage 102 has to be increased in size for passing a larger amount of cooling water therethrough. Of course, this measure tends to increase the size of the integrated drive unit 1000 of the first embodiment.

While, in the integrated drive unit 2000 of the second embodiment, three stator coils $204_{W1}$, $204_{W2}$ and $204_{W3}$ ($204_{U1}$, $204_{U2}$ and $204_{U3}$ or $204_{V1}$, $204_{V2}$ and $204_{V3}$) and three power switching elements 300 incorporated with units $300_{U1}$, $300_{U2}$ and $300_{U3}$ ($300_{V1}$, $300_{V2}$ and $300_{V3}$ or $300_{W1}$, $300_{W2}$ and $300_{W3}$) are arranged to use their closest cooling passage 102 in common unlike in case of the first embodiment 1000. That is, in the second embodiment 2000, the above-mentioned one-sided heating phenomenon does not occur, and thus, the integrated drive unit 2000 of this second embodiment can be made much compact as compared with the integrated drive unit 1000 of the first embodiment.

Figure 6:
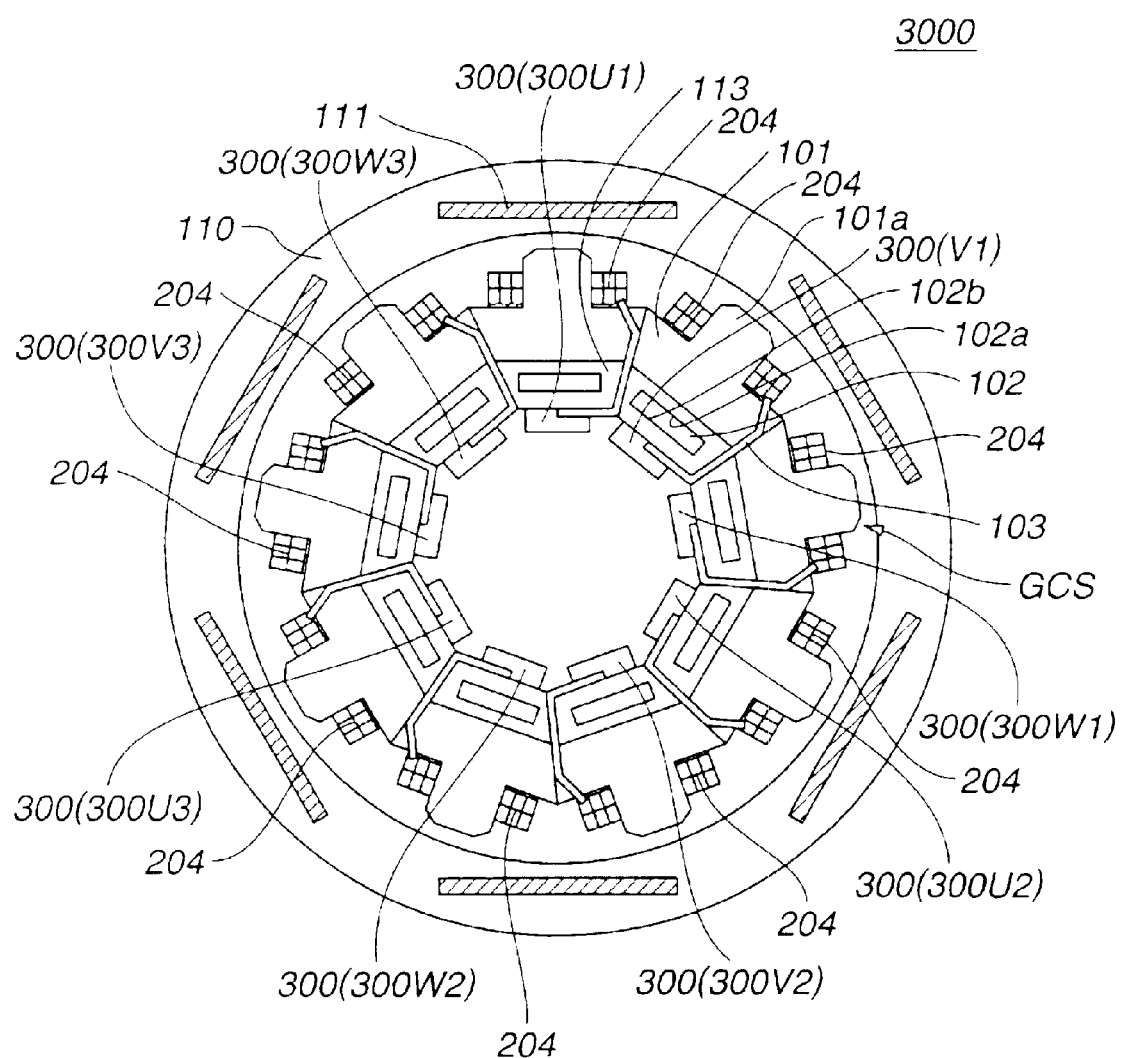
FIG. 6 is a sectional view of an a.c. motor-inverter integrated drive unit which is a third embodiment of the present invention.

Referring to FIG. 6, there is shown an a.c. motor-inverter integrated drive unit 3000 which is a third embodiment of the present invention.

As is seen from the drawing, in this embodiment, the concept of the invention is applied to a so-called outer rotor type a. c. motor. That is, an annular rotor 110 having a plurality of magnets 111 embedded therein is arranged to rotate about a generally cylindrical stator structure "GCS". Cylindrical stator structure "GCS" comprises nine stator cores 101, nine main drive upper/lower arm power switching elements 300 and nine stator coils 204. These elements 101, 300 and 204 are evenly installed in nine blocks in substantially same manner as in case of the first embodiment 1000. That is, each block contains therein one stator core 101, one power switching element 300 and one stator coil 204. However, unlike in case of the first and second embodiments 1000 and 2000, the power switching element 300 of each block is arranged at a radially inside position. Between power switching element 300 and corresponding stator coil 204, there is provided a cooling passage 102.

In this third embodiment 3000, like in the first embodiment 1000, each wiring member 103 from power switching element 300 is connected to a stator coil 204 arranged in the same block.

Because of similar construction to the integrated drive unit 1000 of the first embodiment except the radially inside and outside positioning of the parts, substantially the same advantages as those of the first embodiment 1000 are obtained also in the third embodiment 3000.

The entire contents of Japanese Patent Application 2002-323780 (filed Nov. 7, 2002) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An a.c. motor-inverter integrated drive unit comprising:
   an a.c. motor powered by an alternating current, the motor including a rotor rotatable about a rotation axis, a plurality of stator cores arranged about the rotation axis at evenly spaced intervals to constitute a cylindrical stator structure, a plurality of stator coils disposed on the stator cores respectively and a plurality of cooling passages formed in the stator cores respectively;

an inverter which converts a direct current to an alternating current and includes a plurality of power drivers which are arranged on the stator cores respectively; and wiring members through which the power drivers and the stator coils are connected respectively.

2. An a.c. motor-inverter integrated drive unit as claimed in claim 1, in which the wiring members are the same in shape and construction.

3. An a.c. motor-inverter integrated drive unit as claimed in claim 1, in which each of the cooling passages is positioned between one of the power drivers and one of the stator coils.

4. An a.c. motor-inverter integrated drive unit as claimed in claim 3, in which each cooling passage, the corresponding power driver and the corresponding stator coil are arranged on an imaginary line that extends radially outward from the rotation axis.

5. An a.c. motor-inverter integrated drive unit as claimed in claim 4, in which each cooling passage comprises:

a first cooling surface that is positioned in the vicinity of the power driver; and a second cooling surface that is positioned in the vicinity of the stator coil.

6. An a.c. motor-inverter integrated drive unit as claimed in claim 1, one of the stator cores, the stator coil disposed on the one stator core, the cooling passage provided by the one stator core and the power driver mounted on the one stator core are arranged in an imaginary block.

7. An a.c. motor-inverter integrated rive unit as claimed in claim 6, in which the power driver and the stator coil which are in the same imaginary block are connected through one of the wiring members.

8. An a.c. motor-inverter integrated drive unit as claimed in claim 6, in which the power driver in the imaginary block and the stator coil in another imaginary block that is positioned next to the imaginary block are connected through one of the wiring members.

9. An a.c. motor-inverter integrated drive unit as claimed in claim 1, in which the plurality of power drivers are arranged around the cylindrical stator structure at evenly spaced intervals.

10. An a.c. motor-inverter integrated drive unit as claimed in claim 1, in which the plurality of power drivers are arranged on a cylindrical inner surface of the cylindrical stator structure at evenly spaced intervals.

11. An a.c. motor-inverter integrated drive unit as claimed in claim 1, in which the plurality of power drivers are grouped into U-phase, V-phase and W-phase types, the U-phase type outputting U-phase a.c. electric power, the V-phase type outputting V-phase a.c. electric power and the W-phase type outputting W-phase a.c. electric power.

12. An a.c. motor-inverter integrated drive unit as claimed in claim 11, in which the plurality of power drivers grouped into U-shape, V-phase and W-phase types are put in order of U, V and W.

13. An a.c. motor-inverter integrated drive unit as claimed in claim 1, in which the stator cores of the motor, the stator coils of the motor, the cooling passages of the motor and the power drivers of the inverter are all nine in number.

14. An a.c. motor-inverter integrated drive unit as claimed in claim 1, in which each of the power drivers comprises an upper/lower power switching element.

15. An a.c. motor-inverter integrated drive unit comprising:

a three-phase a.c. motor powered by a three-phase alternating current, the motor including a rotor rotatable about a rotation axis, a plurality of stator cores arranged about the rotation axis at evenly spaced intervals to constitute a cylindrical stator structure, a plurality of stator coils disposed on the stator cores respectively and a plurality of cooling passages formed in the stator cores respectively;

an inverter which converts a direct current to a three-phase alternating current and includes a plurality of power drivers which are arranged on the stator cores respectively; and wiring members through which the power drivers and the stator coils are connected respectively, the wiring members being the same in shape and construction.

* * * * *